United States Patent [19]

Short, III

[11] Patent Number: 4,553,559
[45] Date of Patent: Nov. 19, 1985

[54] RUPTURABLE PRESSURE RELIEF ASSEMBLY

[75] Inventor: Edward H. Short, III, Tulsa, Okla.

[73] Assignee: BS&B Safety Systems, Inc., Tulsa, Okla.

[21] Appl. No.: 654,755

[22] Filed: Sep. 25, 1984

Related U.S. Application Data

[63] Continuation-in-part of Ser. No. 490,132, Apr. 29, 1983, abandoned.

[51] Int. Cl.⁴ ............................................ F16K 13/04
[52] U.S. Cl. ............................ 137/68.1 R; 220/89 A; 220/240; 277/166; 277/168
[58] Field of Search .................... 137/68 R; 220/89 A, 220/240; 277/166, 168

[56] References Cited

U.S. PATENT DOCUMENTS

| | | | |
|---|---|---|---|
| 138,171 | 4/1873 | Matthews | 220/89 A |
| 1,951,897 | 3/1934 | Binckley | 137/68 R X |
| 2,526,794 | 10/1950 | Andrews | 220/89 A |
| 3,448,750 | 6/1969 | Parks | 220/89 A X |
| 3,464,585 | 9/1969 | Summers | 220/89 A |
| 3,526,336 | 9/1970 | Wood | 220/89 A X |
| 3,908,684 | 9/1975 | Short | 220/89 A X |

*Primary Examiner*—Harold W. Weakley
*Attorney, Agent, or Firm*—C. Clark Dougherty, Jr.

[57] ABSTRACT

A rupturable pressure relief assembly of small unitary construction is provided comprised of a hollow housing which includes an annular supporting shoulder within the interior thereof, a circular rupture disk positioned within the housing on the annular supporting shoulder and an annular supporting member positioned within the housing which coacts with the annular supporting shoulder to clamp the rupture disk therebetween. A protruding annulet means is provided for contacting and biting into the rupture disk whereby it will not be moved by fluid pressure and a deformable annular spring means is positioned on the opposite side of the annular supporting member from the rupture disk whereby when the outlet end of the housing is folded over the deformable annular spring means, the rupture disk is rigidly clamped between the housing and the supporting member with the protruding annulet means biting into the rupture disk.

11 Claims, 6 Drawing Figures

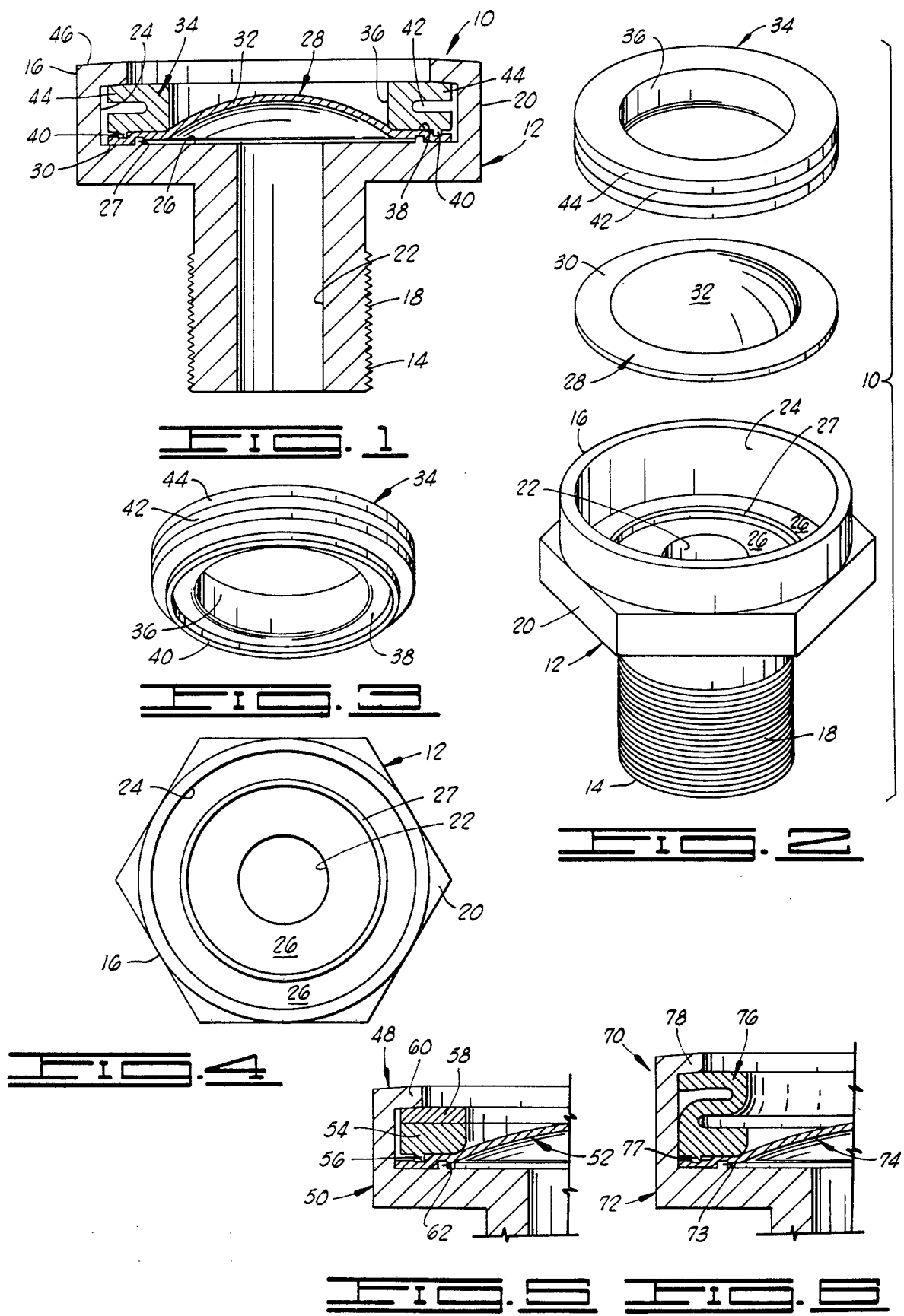

4,553,559

RUPTURABLE PRESSURE RELIEF ASSEMBLY

CROSS REFERENCE TO RELATED APPLICATION

This application is a continuation-in-part of application Ser. No. 490,132 filed on Apr. 29, 1983, now abandoned.

BACKGROUND OF THE INVENTION

1. Field of the Invention

This invention relates generally to rupturable pressure relief assemblies, and more particularly, but not by way of limitation, to rupturable pressure relief assemblies which are placed in systems containing fluids under pressure to insure relief in the event of an overpressure condition.

2. Description of the Prior Art

Many rupturable pressure relief assemblies and devices have been developed and used successfully heretofore. Generally, such devices include a rupture disk which is designed to rupture at a specific pressure range sealingly connected in an assembly which is in turn sealingly connected to a vessel or system containing fluids under pressure whereby the rupture disk is exposed to the fluid pressure. If the fluids within the vessel or system reach an overpressure condition, i.e., a pressure exceeding the design rupture pressure of the rupture disk, the disk ruptures thereby relieving fluids and pressure from the vessel or system.

In many applications of rupturable pressure relief assemblies, the volume and rate of fluids required to be relieved in order to alleviate overpressure is small. Thus, the rupturable pressure relief assemblies used in such applications can also be small. A number of small rupturable pressure relief assemblies which are preassembled by the manufacturer have been developed and used heretofore. An example of such an assembly is disclosed in U.S. Pat. No. 3,908,684 issued Sept. 30, 1975 and assigned to the assignee of this present invention. The rupture disk assembly disclosed includes a reverse buckling rupture disk clamped in a housing by means of a supporting member. The supporting member includes a deformable lip portion and is held in the housing by the upper end portion of the housing which is folded over the lip portion. The supporting member further includes a cutting means for severing the rupture disk upon its reversal. It is indicated in U.S. Pat. No. 3,908,684 that a variety of rupture disks can be utilized in the assembly other than reverse buckling rupture disks, e.g., flat disks and conventional concave-convex disks.

While rupture disk assemblies of U.S. Pat. No. 3,908,684 have achieved considerable success using reverse buckling rupture disks, it has been found that such assemblies using flat or conventional rupture disks are usually unsuccessful in that when fluid pressures are exerted thereon, the disks pull out from between the housing supporting shoulder and the supporting member causing the assemblies to malfunction or fail prematurely.

As is well understood by those skilled in the art, a reverse buckling disk includes a concave-convex portion with the convex side thereof exposed to fluids under pressure whereby upon failure, the concave-convex portion reverses itself and then ruptures. A conventional rupture disk includes a concave-convex portion and has the concave side exposed to fluids under pressure whereby the disk ruptures in tension. A flat disk also ruptures in tension.

By the present invention an improved small unitary rupturable pressure relief assembly is provided which can accommodate any type of rupture disk, i.e., reverse buckling, conventional or flat, without malfunction or premature failure occurring in the operation thereof due to the disk moving or pulling out of its clamped position in the housing.

SUMMARY OF THE INVENTION

The present invention provides a rupturable pressure relief assembly which includes a hollow housing having an inlet end and an outlet end and including an annular supporting shoulder within the interior thereof facing the outlet end. A circular rupture disk is positioned within the housing, the outer annular portion of the rupture disk being supported on the annular supporting shoulder of the housing, and an annular supporting member is positioned within the housing adjacent the rupture disk which includes an annular supporting surface to coact with the annular supporting shoulder in the housing and clamp the outer annular portion of the rupture disk therebetween. A protruding annulet is positioned on the supporting shoulder of the housing which contacts and bites into the outer annular portion of the rupture disk and thereby prevent the rupture disk from moving or pulling out from between the supporting member and the housing. A deformable annular spring means positioned on the opposite side of the annular supporting member from the rupture disk is provided whereby when the spring means is deformed towards the inlet end of the housing, the supporting member and the rupture disk are rigidly clamped against the supporting shoulder within the housing and the protruding annulet means bite into the rupture disk. The outlet end of the housing is folded over the deformable annular spring means so that the spring means is deformed towards the inlet end of the housing.

It is, therefore, a general object of the present invention to provide an improved rupturable pressure relief assembly.

A further object of the present invention is the provision of a small relatively inexpensive preassembled rupture disk unit which can include a conventional, flat or reverse buckling rupture disk having a reliable and long service life.

Yet a further object of the present invention is the provision of a small preassembled rupturable pressure relief assembly which because of its relatively low cost can be discarded and replaced as a unit after rupture.

Other and further objects, features and advantage of the present invention will be readily apparent to those skilled in the art upon a reading of the description of preferred embodiments which follows when taken in conjunction with the accompanying drawings.

BRIEF DESCRIPTION OF THE DRAWINGS

FIG. 1 is a side elevational view of a presently preferred embodiment of the present invention.

FIG. 2 is a perspective view showing the various parts of the apparatus of FIG. 1 in a disassembled condition.

FIG. 3 is a perspective view of the annular supporting member of FIGS. 1 and 2.

FIG. 4 is a top plan view of the housing of FIGS. 1 and 2.

FIG. 5 is a partial enlarged view of an alternate form of the apparatus of the invention in cross section.

FIG. 6 is a partial enlarged view of another alternate form of the apparatus of the invention in cross section.

DESCRIPTION OF PREFERRED EMBODIMENTS

Referring now to the drawings and particularly to FIGS. 1 through 4, the rupturable pressure relief assembly of the present invention is illustrated and generally designated by the numeral 10. The assembly 10 is comprised of a substantially cylindrical housing 12 having a hollow interior, an inlet end 14 and an outlet end 16. As illustrated in the drawings, the housing 12 is preferably formed in the shape of a fitting which can be conveniently threaded into a corresponding conventional female fitting. That is, a portion of the housing 12 at the inlet end 14 thereof is formed of reduced diameter and includes conventional threads 18 disposed on the outside peripheral surface thereof. An enlarged portion 20 of the housing 12 adjacent the outlet end 16 thereof is formed into a hex head for facilitating the threading of the housing 12 into another threaded fitting. A central bore 22 is disposed in the housing 12 for communicating fluid pressure therethrough and a cylindrical recess 24 is provided at the top portion of the housing 12 forming an annular shoulder 26 within the interior of the housing 12. An integral raised annulet 27 is provided on the shoulder 26 positioned concentrically with respect to the bore 22. The annulet 27 is preferably of rectangular shape in cross-section whereby a flat surface is provided on the annulet which is parallel to the plane of the shoulder 26 as shown in FIG. 1.

A circular rupture disk 28, which in the form illustrated in the drawings is a conventional rupture disk, is positioned within the housing 12 adjacent the annular shoulder 26 and annulet 27 thereof. More specifically, the rupture disk 28 includes an annular flange portion 30 connected to a central concave-convex portion 32. The annular flange portion 30 is positioned against and is supported by the annular shoulder 26 of the housing 12 and the concave-convex portion 32 of the disk 28 is positioned whereby the concave side of the portion 32 faces the central bore 22 of the housing 12. That is, fluid under pressure is communicated from the inlet end 14 of the housing 12 by way of the bore 22 to the concave side of the concave-convex portion 32 of the disk 28. The rupture disk 28 is formed of metal or other material having a predetermined design rupture pressure. The term "design rupture pressure" is used herein to mean that fluid pressure level which when exerted on a rupture disk causes the disk to rupture. As mentioned above, the rupture disk 28 can be of conventional design as shown in the drawings or the disk 28 can be flat or the housing 12 of the assembly 10 can be modified whereby a reverse buckling rupture disk can be utilized. In addition, the rupture disk 28 can include scores on a surface thereof to provide lines of weakness therein or the rupture disk can be any of various composite disks comprised of two or more parts.

An annular supporting member 34 is provided positioned within the housing 12 adjacent the rupture disk 28. The supporting member 34 is preferably of cylindrical shape and includes a central opening 36 therein through which fluid under pressure is relieved from the housing 12 upon the rupture of the disk 28. The supporting member 34 includes an annular surface 38 corresponding with the annular shoulder 26 of the housing 12 to support the annular flange portion 30 of the rupture disk 28. Like the annular shoulder 26 of the housing 12, the annular surface 38 of the member 34 includes a protruding annulet 40 for contacting and biting into the outer annular flange portion 30 of the rupture disk 28. The annulet 40 on the surface 38 of the supporting member 34 is positioned concentrically with respect to the supporting member 34 and is of a larger inside diameter than the outside diameter of the annulet 27 on the shoulder 26 so that it is positioned exteriorly of the annulet 27. Preferably, the annulet 40 is of rectangular shape in cross section whereby a flat surface is provided thereon which is parallel to the plane of the annular surface 38. The supporting member 34 also includes a continuous groove 42 disposed around the peripheral sides thereof whereby an upper outwardly extending lip portion 44 is provided thereon which functions as a deformable spring means.

A top portion 46 at the outlet end 16 of the housing 12 is folded inwardly or crimped over the lip portion 44 of the support member 34 so that the lip portion 44 is deformed downwardly thereby rigidly clamping the supporting member 34 and the rupture disk 28 within the housing 12. The protruding annulet 40 of the supporting member 34 and the protruding annulet 27 of the housing 12 positioned interiorly thereof bite into and deform the outer annular flange portion of the rupture disk 28 thereby creating a fluid pressure-tight seal between the supporting member 34, rupture disk 28 and housing 12. In addition, the flange portion 30 of the rupture disk 28 is prevented from moving or pulling out from between the supporting member 34 and the housing 12 by the annulets 27 and 40.

When the upper end portion 46 of the housing 12 is crimped over the outwardly extending lip 44 of the supporting member 34, the lip 44 is deformed downwardly past its yield point. This insures that the protruding annulets 27 and 40 of the housing 12 and supporting member 34 are rigidly clamped against the annular flange portion 30 of the rupture disk 28 whereby the annulets 27 and 40 bite into the rupture disk as shown in FIG. 1. The supporting member 34 and housing 12 are formed of harder materials than the material forming the rupture disk 28 and consequently, when the annular flange portion of the rupture disk is forceably clamped between the supporting member and housing, the annulets 40 and 27 thereof bite into the rupture disk. This, in turn, provides the necessary resistance to rupture disk pull-out.

The groove 42 in the peripheral sides of the supporting member 34 is positioned with respect to the top thereof so that the lip portion 44 formed thereby is of a known depth and thickness. The known depth and thickness of the lip portion 44 in combination with a knowledge of the material from which the supporting member 34 is formed, allows the calculation of the force required to deform the lip portion 44 past its yield point using conventional engineering techniques. The force required for deforming the lip portion 44 is the force exerted on the annular flange portion 30 of the rupture disk 28. Thus, the force or load placed on the rupture disk can be predetermined by controlling the size and placement of the groove 42 in the supporting member 34. In addition, deformation of the lip portion 44 around the entire periphery of the supporting member 34 insures that the rupture disk 28 is deformed and rigidly held within the housing 12 under a uniform load.

Referring now to FIG. 5, an alternate form of the apparatus of the invention is illustrated and generally designated by the numeral 48. The assembly 48 includes a housing 50 having a protruding annulet 62 which is identical to the housing 12 and annulet 27 described above, a rupture disk 52 identical to the rupture disk 28 described above and an annular supporting member 54. The annular supporting member 54 includes a protruding annulet 56 as does the annular supporting member 34 described above, but instead of a deformable spring means comprised of a recess and lip portion, the annular supporting member 54 is of solid construction and the deformable spring means is a conventional Bellville spring 58 of a size complementary with the supporting member 54 positioned on top of the suppporting member 54. When deformed downwardly by a folded over portion 60 of the housing 50, the Bellville spring 58 functions to create a downward force on the supporting member 54 in the same manner as does the lip portion 44 of the supporting member 34 of the assembly 10 described above.

Referring finally to FIG. 6, yet another form of apparatus of the invention is illustrated and generally designated by the numeral 70. The assembly 70 includes a housing 72 having an annulet 73 identical to the housing 12 of the assembly 10 described above and a rupture disk 74 identical to the rupture disk 28 of the assembly 10 described above. An annular supporting member 76 having an annulet 77 is provided which is similar to the supporting member 34 of the assembly 10 described above, except that instead of a single deformable lip portion, the supporting member 76 of the assembly 70 is formed in the shape of an "S" in cross section to increase the amount of elastic deflection of the member 76 when forced downwardly by a folded over portion 78 of the housing 72.

The particular embodiment of the apparatus of this invention utilized depends on various design factors including the particular application in which the apparatus is to be used, ease of manufacture, economy, etc. Presently, however, as stated above, the embodiment of the invention illustrated in FIGS. 1-4 is preferred.

Operation

In operation, the apparatus 10 is threadedly connected into a pipe fitting which is in turn connected to a system or vessel containing pressurized fluid. The design rupture pressure of the rupture disk 28 is such that rupture does not occur so long as normal pressure levels are contained within the vessel or system being protected. Fluid pressure from the vessel or system is communicated by way of the bore 22 in the housing 12 to the rupture disk 28. When an overpressure condition exists within the vessel or system, the force exerted on the concave side of the rupture disk 28 caused the disk 28 to rupture.

Because of the protruding annulets 27 and 40 on the housing 12 and supporting member 34 which bite into the annular flange portion 30 of the rupture disk 28, the rupture disk 28 is prevented from moving within or pulling out of clamping contact with the housing 12 and supporting member 34. The annulets also bring about an improved seal between the rupture disk 28, the housing 12 and the supporting member 34.

Once the rupture disk 28 ruptures due to the existence of an overpressrue condition within the vessel or system being protected, pressurized fluids are relieved through the assembly 10 into the atmosphere.

As will be readily apparent to those skilled in the art, a variety of changes can be made to the various parts of the assembly of the present invention. For example, the protruding annulet can have various cross-sectional shapes other than the rectangular or square cross-sectional shapes illustrated in the drawings and the annular supporting surfaces of the housing and the supporting member as well as the peripheral portion of the rupture disk can be of various complementary shapes. In addition, various deformable spring means can be utilized and the supporting member and spring means can be rigidly held within the housing in a variety of ways other than by folding an upper end portion over the supporting member, e.g., such as by the use of a snap ring fitted into a groove disposed within the housing.

Thus, the apparatus of the present invention is well adapted to carry out the objects and attain the ends and advantages mentioned as well as those inherent therein. While presently preferred embodiments of the invention have been described for purposes of this disclosure, numerous changes in addition to those discussed above in the arrangement and construction of parts will readily suggest themselves to those skilled in the art, all of which changes are encompassed within the spirit of this invention as defined by the appended claims.

What is claimed is:

1. A rupturable pressure relief assembly comprising:

a hollow housing having an inlet end and an outlet end and including an annular supporting shoulder within the interior thereof facing the outlet end, said annular supporting shoulder having a protruding annulet of substantially rectangular cross-sectional shape formed thereon;

a circular rupture disk positioned within said housing, the outer annular portion of said rupture disk being supported by said annular supporting shoulder and said protruding annulet of said housing;

an annular supporting member positioned within said housing adjacent said rupture disk including an annular supporting surface to coact with said annular supporting shoulder in said housing and clamp the outer portion of said rupture disk therebetween, said annular supportng surface including a protruding annulet of substantially rectangular cross-sectional shape formed thereon and positioned exteriorly of said protruding annulet on said supporting shoulder of said housing;

a deformable annular spring means positioned on the opposite side of said annular supporting member from said rupture disk whereby when said spring means are deformed towards the inlet end of said housing, said supporting member and said rupture disk are rigidly clamped against said supporting shoulder within said housing and said protruding annulet bites into said rupture disk thereby preventing said rupture disk from moving or pulling out from between said supporting member and housing; and means for deforming said deformable annular spring means towards the inlet end of said housing attached to said housing.

2. The assembly of claim 1 wherein said means for deforming said deformable annular spring means are comprised of the outlet end portion of said housing which is folded over said deformable annular spring means.

3. The assembly of claim 1 wherein said deformable annular spring means is a Bellville spring.

4. The assembly of claim 1 wherein said deformable annular spring means is an outwardly extending annular lip portion of said annular suporting member having a predetermined yield strength and said folded over portion of said housing deforms said lip portion past the yield point thereof whereby said supporting member is uniformly clamped against said rupture disk.

5. The assembly of claim 4 wherein said housing is further characterized to include:
   the inlet end portion thereof including threads disposed around the outside periphery thereof; and
   the outlet end thereof including a plurality of flat surfaces formed around the outside periphery thereof.

6. The assembly of claim 1 wherein said rupture disk is flat.

7. The assembly of claim 1 wherein said rupture disk includes an annular flat flange portion connected to a central concave-convex portion.

8. A rupturable pressure relief assembly comprising:
   a cylindrical housing having an inlet end and an outlet end and having a cylindrical recess in the outlet end thereof forming an annular shoulder therein, said annular shoulder having a concentrically positioned protruding annulet of substantially rectangular cross-sectional shape formed thereon;
   a concave-convex rupture disk positioned within said housing having an annular flange portion connected to a central concave-convex portion, said annular flange portion conforming with and being supported on said annular shoulder and said protruding annulet thereon within said housing;
   an annular supporting member including an annular supporting surface conforming with said annular flange portion of said rupture disk having a concentric protruding annulet of substantially rectangular cross-sectional shape positioned exteriorly to said protruding annulet on said supporting shoulder of said housing formed thereon, said supporting member being positioned within said housing adjacent said rupture disk so that said annular supporting surface and the protruding annulet thereon contacts said annular flange portion of said rupture disk;
   a deformable spring means positioned on the opposite side of said annular supporting member from said rupture disk whereby when said spring means are deformed towards the inlet end of said housing, said supporting member and said rupture disk are rigidly clamped against said supporting shoulder within said housing and said protruding annulets on said supporting member and said housing bite into said rupture disk;
   the top end portion of said cylindrical housing being folded over said deformable spring means so that said spring means are deformed towards the inlet end of said housing.

9. The assembly of claim 8 wherein said deformable annular spring means is a Bellville spring.

10. The assembly of claim 8 wherein said deformable annular spring means is an outwardly extending annular lip portion of said annular suporting member having a predetermined yield strength and said folded over portion of said housing deforms said lip portion past the yield point thereof whereby said supporting member is uniformly clamped against said rupture disk.

11. The assembly of claim 10 wherein said housing is further characterized to include:
    the inlet end portion thereof including threads disposed around the outside periphery thereof and being adapted for threaded connection into a conventional female threaded fitting; and
    the outlet end portion thereof including a plurality of flat surfaces formed around the outside periphery thereof for facilitating threadedly connecting said inlet end portion into said fitting.

* * * * *